A. C. KREBS.
LUBRICATION OF ENGINES.
APPLICATION FILED MAR. 17, 1913.
1,096,924.
Patented May 19, 1914
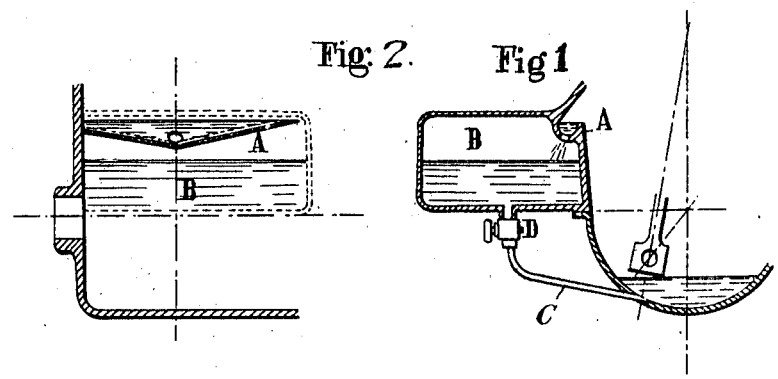
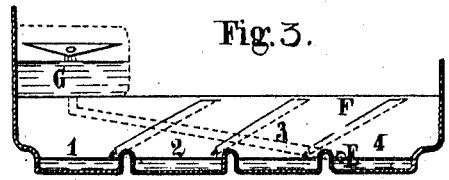
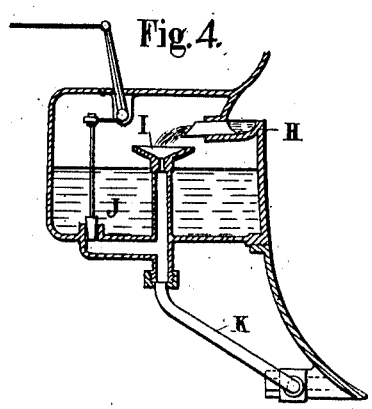
WITNESSES
INVENTOR
Arthur Constantin Krebs.
BY
ATTORNEY

UNITED STATES PATENT OFFICE.

ARTHUR CONSTANTIN KREBS, OF PARIS, FRANCE, ASSIGNOR TO SOCIÉTÉ ANONYME DES ANCIENS ETABLISSEMENTS PANHARD & LEVASSOR, OF PARIS, FRANCE.

LUBRICATION OF ENGINES.

1,096,924.  Specification of Letters Patent.  Patented May 19, 1914.

Application filed March 17, 1913. Serial No. 754,973.

*To all whom it may concern:*

Be it known that I, ARTHUR CONSTANTIN KREBS, a citizen of the Republic of France, and resident of Paris, France, have invented new and useful Improvements in the Lubrication of Engines, which are fully set forth in the following specification.

This invention relates to a device for the lubrication of engines, which combines the advantages of splash lubrication with those of a continuous circulation of oil.

In order to make the following explanations as clear as possible, the accompanying drawings show by way of example the device according to this invention.

Figures 1 and 2 are vertical sectional views of the improved device, taken at right angles to each other; Fig. 3 is a diagrammatic view of the device applied to a four-cylinder engine; and Fig. 4 is a diagrammatic view showing a method of regulating the oil sent into the engine.

In splash lubrication, as generally adopted, either the crank or the connecting rod head, in its movement of rotation, touches the surface of the oil which collects at the bottom of the crank case, and splashes the lubricant in fine drops. Orifices or conduits provided for the purpose collect the oil which trickles down the walls, and convey it between the moving surfaces. The degree of lubrication depends therefore on the quantity projected, that is to say, on the level of oil in the crank case.

This invention has for its object to maintain the said level as nearly as possible constant by means of a very active oil circulation produced by the splashing itself. To that end, a groove or pocket A suitably arranged in the walls of the crank case (Figs. 1 and 2) and inclined so as to be able to work whatever be the inclination that the engine may assume in operation, collects a portion of the oil projected against the wall and conveys it into a tank B which forms the accumulator, whence the oil returns to the engine through a pipe C, the cock D of which enables the supply to be regulated at will. If the level has a tendency to rise in the crank case of the engine, the quantity of oil projected becomes larger and larger, so that the pocket will supply more oil to the tank, and if the admission will have remained constant, the level in the crank case has a tendency to become reëstablished.

This device can be advantageously applied to crank cases of multi-cylinder engines in order to maintain a constant quantity of oil in each of the splashing compartments. Fig. 3 shows diagrammatically the circulation of the lubricating oil for an engine with four vertical cylinders. A portion of the splashing oil collects in the pocket F of an end compartment, for instance, the fourth, and is discharged therefrom into the adjoining or third compartment. In the same way, the oil passes from the third compartment to the second, and from the latter to the first compartment. From the said first compartment, the oil is returned to tank G, whence it is again delivered to compartment 4 by gravity, as shown in Fig. 3, through a pipe E, the mouth of which opens into that compartment. The flow of oil through this pipe is controlled at will by a cock, (not shown).

By way of carrying out the construction, Fig. 4 shows a scheme for regulating the oil sent into the engine, and in this figure a device is represented for returning the oil by gravity alone. The oil from the engine, collects in pocket H, and flows therefrom into a funnel I, the outlet opening of which is gaged in order to afford passage to the quantity of oil required for driving slowly. The excess of oil falls back into the tank. The needle valve J, which may be operated in any desired manner, (preferably by means of a suitable connection, not shown, with the inlet valve of the engine), permits the additional quantity of oil necessary for perfect lubrication, when the engine is running at full speed, to flow into the return pipe K, and thence to the engine.

Claims.

1. In a lubricating system for engines, the combination, with the crank case; of an open-topped pocket provided on the wall of said case for catching oil splashed thereinto from the case; a receiving tank connected to said case, said pocket projecting into said tank and having a discharge opening for delivering the collected oil thereinto; and a depending pipe leading from the bottom of said tank to said case for returning the oil by gravity from the former to the latter, said pipe being provided with means for controlling the passage of the oil therethrough.

2. In a lubricating system for multi-cylinder engines, the combination of a crank case provided with an interior, oil-receiving compartment for each cylinder, said compartments being arranged in line; an open-topped pocket provided on the wall of said case directly above one of said compartments, for catching and collecting oil splashed thereinto from that compartment; an open-topped oil-catching pocket provided on said wall above each of the remaining compartments and inclined downwardly toward the next compartment for feeding oil into that compartment; a receiving tank connected to said case and having the first-named pocket projecting into it, said pocket having a discharge opening for delivering the collected oil into the tank; and a depending pipe leading from the bottom of said tank into the crank case, for returning the oil by gravity from the former to the latter.

In testimony whereof I have signed this specification in the presence of two describing witnesses.

ARTHUR CONSTANTIN KREBS.

Witnesses:
　EMILE LEDRET,
　LUCIEN MEMMINGER.